US006798786B1

United States Patent
Lo et al.

(10) Patent No.: US 6,798,786 B1
(45) Date of Patent: Sep. 28, 2004

(54) MANAGING CALLS OVER A DATA NETWORK

(75) Inventors: Wing F. Lo, Plano, TX (US); Xuewen Li, Cary, NC (US); Alireza Abaye, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/370,984

(22) Filed: Aug. 20, 1999

Related U.S. Application Data

(60) Provisional application No. 60/137,877, filed on Jun. 7, 1999.

(51) Int. Cl.[7] .............................. H04Q 7/00; H04J 3/16

(52) U.S. Cl. ....................... 370/468; 370/329; 370/392; 370/352; 709/226

(58) Field of Search ................................. 370/352–360, 370/229–236.1, 329, 389, 392, 341, 468; 379/88.1, 900; 709/224, 226, 238

(56) References Cited

U.S. PATENT DOCUMENTS

| | | | | | |
|---|---|---|---|---|---|
| 5,115,429 | A | * | 5/1992 | Hluchyj et al. | 370/231 |
| 5,526,353 | A | * | 6/1996 | Henley et al. | 370/392 |
| 5,633,861 | A | * | 5/1997 | Hanson et al. | 370/232 |
| 5,828,666 | A |   | 10/1998 | Focsaneanu et al. | |
| 5,870,561 | A | * | 2/1999 | Jarvis et al. | 709/238 |
| 5,883,891 | A | * | 3/1999 | Williams et al. | 370/356 |
| 5,889,774 | A | * | 3/1999 | Mirashrafi et al. | 370/352 |
| 5,907,610 | A | * | 5/1999 | Onweller | 370/352 |
| 5,953,322 | A | * | 9/1999 | Kimball | 370/328 |
| 6,046,678 | A | * | 4/2000 | Wilk | 340/686.1 |
| 6,069,890 | A | * | 5/2000 | White et al. | 370/352 |
| 6,222,829 | B1 | * | 4/2001 | Karlsson et al. | 370/329 |
| 6,356,545 | B1 | * | 3/2002 | Vargo et al. | 370/355 |
| 6,373,835 | B1 | * | 4/2002 | Ng et al. | 370/352 |
| 6,426,942 | B1 | * | 7/2002 | Sienel et al. | 370/235 |
| 6,426,955 | B1 | * | 7/2002 | Dalton et al. | 370/401 |
| 6,430,289 | B1 | * | 8/2002 | Liffick | 379/900 |
| 6,463,044 | B1 | * | 10/2002 | Seo | 370/329 |
| 6,477,143 | B1 | * | 11/2002 | Ginossar | 370/230 |
| 6,501,736 | B1 | * | 12/2002 | Smolik et al. | 370/252 |

FOREIGN PATENT DOCUMENTS

| WO | WO 99/23799 | * | 5/1999 | ............ H04L/29/06 |
|---|---|---|---|---|

OTHER PUBLICATIONS

International Business Machines Corp., *ATM Overview*, pp. 1–4 (1995).

Y. Bernet, et al., *A Framework for End–to–End QOS Combining RSVP/Intserv and Differentiated Services*, Internet Engineering Task Force Internet Draft, pp. 1–15, (Mar. 1998).

R. Braden, et al., *Resource Reservation Protocol (RSVP)*, Version 1 Functional Specification, pp. 1–62, Request for Comments 2205 (Sep. 1997).

(List continued on next page.)

*Primary Examiner*—Afsar Qureshi
(74) *Attorney, Agent, or Firm*—Trop, Pruner & Hu, P.C.

(57) ABSTRACT

A method and system of managing calls over a data network includes determining an available bandwidth of the data network. After a call request is received for establishing a call between at least two network terminals, one or more of a plurality of resource elements are selected in response to the call request based on the bandwidth of the data network. The resource elements, which can include codecs (coders/decoders), packet sizes (for carrying audio data), and others, are used in the requested call between the at least two network terminals. Further, a plurality of communities may be defined each including one or more terminals. One or more usage threshold values may be assigned to a link or links between communities, and a call request is processed based on the one or more usage threshold values. The processing includes at least one of determining whether to admit the call request and selecting resource elements to be used during a call between terminals over the link.

32 Claims, 11 Drawing Sheets

OTHER PUBLICATIONS

Databeam Corp., *A Primer on the H–323 Series Standard*, Version 2.0, pp. 1–21, printed from web site http://www.databeam.com, dated at least as early as Jul. 2, 1999.

Trillium Digital Systems, Inc., *Trillium IP Quality of Service White Paper*, pp. 1–37 (Apr. 17, 1998).

J. Toga, et al., *Demystifying Multimedia Conference Over the Internet Using the H.323 Set of Standards*, pp. 1–11, Intel Technology Journal (Second Quarter, 1998).

The Applied Technologies Group, *Wireless Enterprise Networking*, The Technology Guide Series, 1–40 (1998).

* cited by examiner

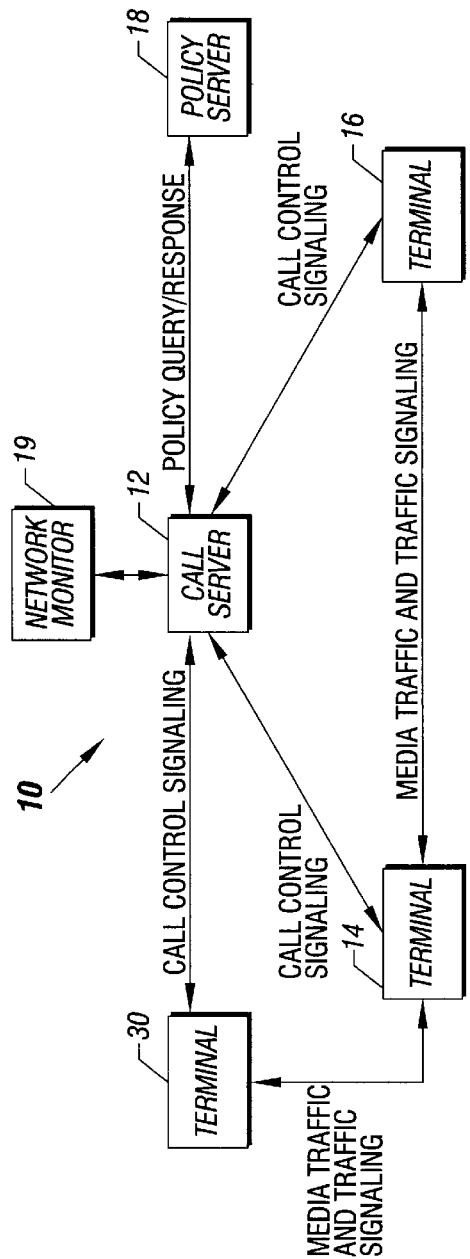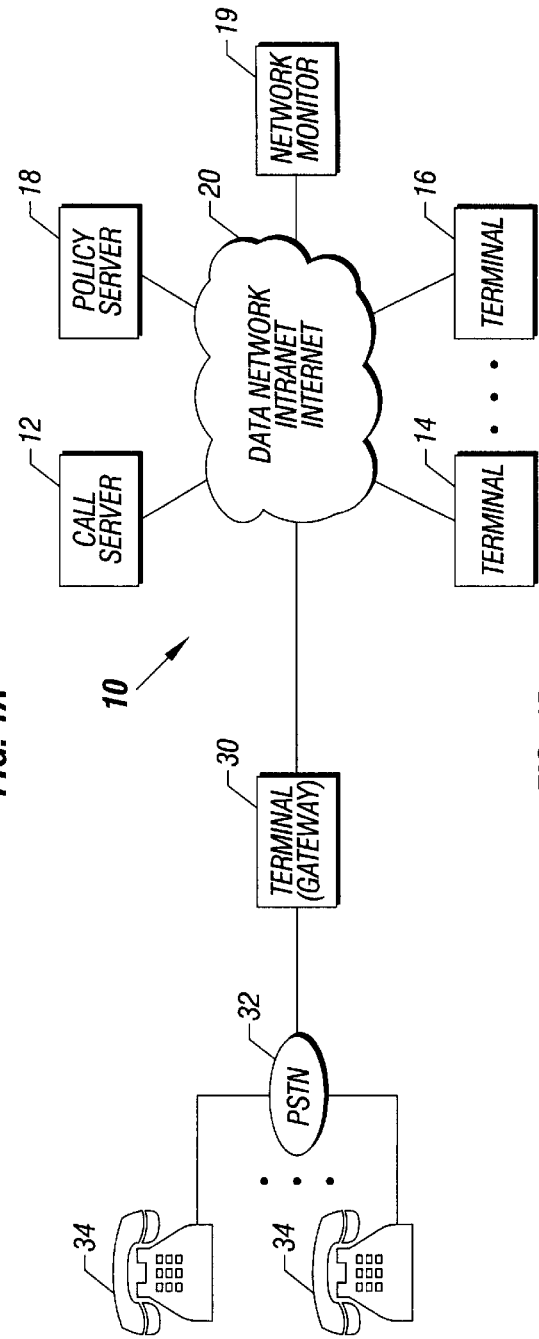

MANAGING CALLS OVER A DATA NETWORK

The present application claims priority under 35 U.S.C. §119(e) to U.S. Provisional Patent Application Ser. No. 60/137,877, entitled "Coding Resource Selection for Packet Voice," filed Jun. 7, 1999.

BACKGROUND

The invention relates to managing calls over a data network, such as an Internet Protocol (IP) network.

Packet-based data networks are widely used to link various nodes, such as personal computers, servers, gateways, and so forth. Packet-based data networks include private networks, such as local area networks (LANs) and wide area networks (WANs), and public networks, such as the Internet. The increased availability of such data networks has increased accessibility among nodes, whether the nodes are located in close proximity to each other (such as within an organization) or at far distances from each other. Popular forms of communications across such data networks include electronic mail, file transfer, web browsing, and other exchanges of digital data.

With the increased capacity and reliability of data networks, voice communications over data networks, including private and public networks, have become possible. Voice communications over packet-based data networks are unlike voice communications in a conventional public switched telephone network (PSTN), which provides users with dedicated, end-to-end circuit connections for the duration of each call. Communications over data networks, such as IP (Internet Protocol) networks, are performed using packets that are sent in bursts from a source to one or more destination nodes. Voice data sent over a data network has to share the network bandwidth with conventional non-voice data (e.g., electronic mail, file transfer, web access, and other traffic). One standard that has been implemented for communications of voice as well as other data is the H.323 recommendation from the Telecommunication Sector of the International Telecommunication Union (ITU-T), which describes terminals, equipment and services for multimedia communications over packet-based networks.

In an IP data network, each data packet is routed to a node having destination IP address contained within the header of each packet. Data packets may be routed over separate network paths before arriving at the final destination for reassembly. Transmission speeds of the various packets may vary widely depending on the usage of data networks over which the data packets are transferred. During peak usage of data networks, delays added to the transfer of voice data packets may cause poor performance of voice communications. Voice data packets that are lost or delayed due to inadequate or unavailable capacity of data networks or resources of data networks may result in gaps, silence, and clipping of audio at the receiving end.

A need thus exists for an improved method and system to manage the quality of voice calls or other audio communications over data networks.

SUMMARY

In general, according to one embodiment, a method of managing calls over a data network includes determining usage information of the data network. A call request is received for establishing a call between at least two network terminals. One or more of a plurality of resource elements are selected as candidates for use in the requested call in response to the call request based on usage information of the data network.

In general, according to another embodiment, a method of managing calls in a telephony system includes defining a plurality of communities each including one or more communication endpoints and assigning one or more usage threshold values to a link between communities. Further, a call request is processed based on the one or more usage threshold values. The processing includes determining whether to admit the call request over the link.

Some embodiments of the invention may provide one or more of the following advantages. Resource elements can be selected to optimize quality of service while at the same time taking into account the usage of the data network as well as usage of other transmission or communications resources. Proper selection of resource elements as well as call admission control reduces the likelihood of overburdening links between terminals. As a result, the likelihood of delays in the communication of audio data that may lead to various audio distortions is also reduced. By efficiently using packet-based data networks for telephony and other forms of audio communications, sharing of such data networks for carrying audio data (which are relatively time sensitive) and traditional forms of digital data (such as electronic mail traffic, file transfer traffic, and other traffic) can be made more effective.

Other features and advantages will become apparent from the following description and from the claims.

BRIEF DESCRIPTION OF THE DRAWINGS

FIGS. 1A–1B are block diagrams of an embodiment of a telephony communications system in which voice or other audio data may be communicated over packet-based data networks.

DETAILED DESCRIPTION

Figure 2:
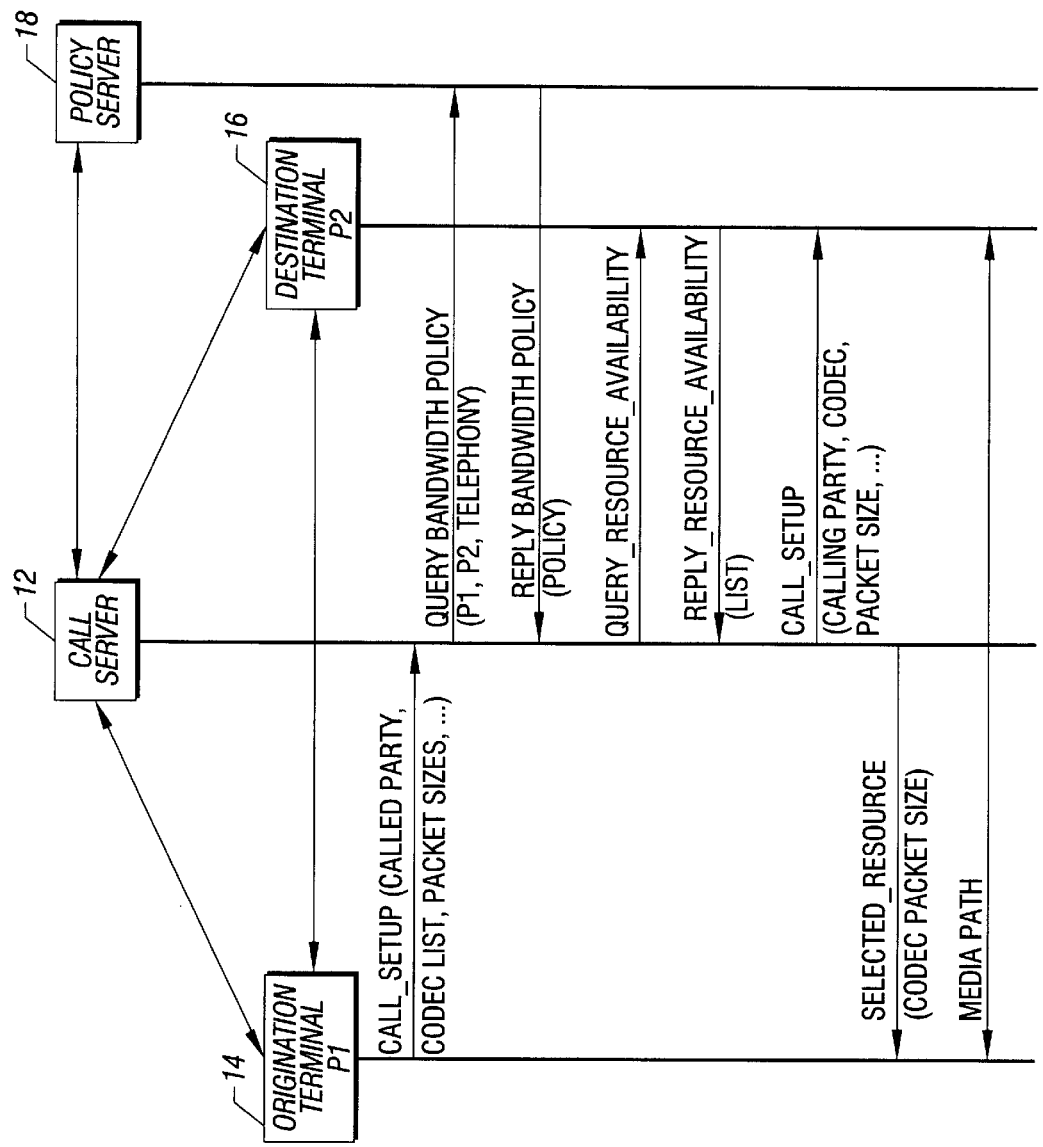
FIG. 2 illustrates the flow for processing a call request between an origination terminal and a destination terminal in accordance with one embodiment.

In the following description, numerous details are set forth to provide an understanding of the present invention.

However, it will be understood by those skilled in the art that the present invention may be practiced without these details and that numerous variations or modifications from the described embodiments may be possible. For example, although the description refers to telephony communications over data networks, certain aspects of the methods and apparatus described may be advantageously used with other types of communications systems, such as those communicating video or multimedia data (for video conferencing, for example).

Referring to FIGS. 1A and 1B, one embodiment of a telephony communications system 10 includes a number of endpoints or terminals (terminals 14, 16, and 30 illustrated) that are capable of performing voice or other audio communications over a packet-based or message-based data network 20. As used here, "telephony communications" refers to the transmission and receipt of sounds (e.g., voice or other audio signals) between different points in a system using either wireline or wireless links. Example terminals 14, 16, and 30 may include computer systems with speech capability, telephone units that include interfaces to the data network 20, gateways coupled to standard telephones 34 though a public switched telephone network (PSTN) 32, and other types of communication devices. Telephony communications can occur between any two or more terminals over the data network 20.

The data network 20 may include, as examples, private networks such as intranets (e.g., local area networks and wide area networks), and public networks such as the Internet. More generally, as used here, a data network is any communications network that utilizes message-based or packet-based communications. In one embodiment, the data network 20 communicates according to the Internet Protocol (IP), as described in Request for Comment (RFC) 791, entitled "Internet Protocol," dated September 1981. The data network 20 may include a single network or link or multiple networks or links that are coupled through gateways, routers, and the like.

In one embodiment, a call server 12 is coupled to the data network 20 to manage telephony communications (e.g., call setup, processing, and termination) between or among the terminals 14, 16, and 30 (and other terminals). A policy server 18 may be accessible by the call server 12 to determine usage policy for telephony communications over the data network 20 to control the quality of service on the data network 20. For example, the policy server 18 may set the telephony usage of the data network 20 for different time periods. During periods of expected high traffic (e.g., business hours), policy server 18 may set a low usage target for telephony communications. On the other hand, during periods of low expected traffic, the target usage of the data network 20 for telephony communications may be set higher.

Additionally, a network monitor system 19 may be coupled to the data network 20 to monitor certain characteristics and conditions of one or more portions of the data network 20. The characteristics and conditions monitored may include packet delays, jitter, and packet losses. Packet delay refers to a delay experienced in transmission due to high traffic or other conditions. Packet loss refers to the percentage loss of packets. Jitter refers to variations in the delay of different packets in the same transmission. Jitter may contribute to delay on a network link since receiving platforms need to buffer the received data packets to take into account the different delays of packets.

Although only one call server and policy server are illustrated, multiple call servers and policy servers may be coupled to the data network. In this arrangement, each of the multiple call servers may be responsible for managing call requests from a predetermined group of terminals, and each policy server may be responsible for maintaining usage policy for different portions of the data network 20. Further, more than one network monitor 19 may be included in the telephony communications system 10. For example, multiple network monitors may be located to enable monitoring of characteristics and conditions of different portions of the data network 20. A call server, policy server, and network monitor may be implemented on separate platforms or in the same platform.

To establish a call between two or more terminals for performing telephony communications, a call request is sent from an origination terminal to the call server 12 for processing. The call request includes the IP address of the origination terminal, the directory number of the destination terminal, and a list of one or more resource elements supported by the origination terminal to be used during an established call. A terminal may be relatively busy at the time a call is desired. As a result, processing capability and storage capability in the origination terminal may be limited so that resource elements that require high bandwidth are not indicated as being supported. Examples of resource elements include codecs (coders/decoders), the size of packets carrying audio data, and other resource elements, as explained further below.

By querying the policy server 18, the call server 12 determines the usage policy for the data network portions over which the call will be established and discards any resource elements that may be inconsistent with that policy. Additionally, the call server 12 can further restrict use of resource elements based on actual usage of transmission resources. Thus, for example, if a relatively large number of calls have been placed through the call server 12, the types of resource elements that may be employed for further calls may be those that have relatively low bandwidth requirements. Thus, the call server 12 is able to manage call requests based on usage information, including usage policy and/or actual usage of the data network 20.

Optionally, according to some embodiments, the call server 12 may also query the network monitor 19 to determine the current characteristics and conditions of the network. Selection of resource elements may thus further be based on the current characteristics and conditions of the network (e.g., delays being experienced by packets and percentage of packet loss). Next, the call server 12 ranks the remaining supportable resource elements based on predetermined merit attributes, which may include quality of service, the available bandwidth, expected usage of transmission resources, and other attributes. Selection of the resource elements to use for a particular call is based on the ranking performed by the call server 12.

One type of resource element is the audio coder/decoder (codec) used by each of the terminals involved in a call session. An audio codec encodes audio signals originating from an audio input device (e.g., microphone) for transmission and decodes received audio data for output to an output device (e.g., a speaker). The codec can be implemented in software. Several types of codecs are available that have varying levels of data compression and data transfer rate requirements. For example, the G.711 codec provides uncompressed communications of voice data, but has a data transfer rate requirement of 64 kbps (kilobits per second) in each direction. Other codecs, such as the G.728, G.729A, G.729, G.723.1, and G.722 have varying compression algorithms and data transfer rate requirements (which are lower than that of the G.711 codec). The listed G series of audio codecs are recommendations from the International Telecommunication Union (ITU). Other types of codecs may be supported by terminals in further embodiments.

Generally, higher compression leads to a reduced amount of data so that data transfer rate requirements over a link may be reduced. However, because compression of data may cause loss of information, audio quality may be adversely affected. Thus, the two objectives of higher quality audio and lower data transfer rate requirements may conflict.

Conventionally, an origination terminal that desires to establish a voice communication with a destination terminal sends a list of supported codecs to the destination terminal. In response, the destination terminal chooses an acceptable codec from the list. Such a process is provided by the H.323 protocol, which is a recommendation for packet-based multimedia communications systems from the ITU-T. Although such a process allows voice communications employing a commonly supported codec between the origination and destination terminals, it does not take into account the capacity and usage of the link and other transmission resources between the terminals, in this case the data network 20, as well as other transmission or communications resources.

Another resource element is the network packet size supported by the codec to communicate voice or other audio. As used here, network packet size refers to the size of the network packet used to carry audio data. In one embodiment, the packet includes an IP packet, which includes an IP header and IP payload. In further embodiments, other types of network packets may be employed, depending on the type of the data network 20. Inside the IP payload may be a TCP (Transmission Control Protocol) or UDP (User Datagram Protocol) packet. A TCP or UDP packet includes a header and payload. For telephony communications, the payload of a UDP packet may include an RTP (Real-Time Transmission Protocol) packet. RTP is a protocol for the transport of real-time data, including audio and video. An RTP packet includes an RTP header and an RTP payload, which can carry one or more frames of audio data. TCP is described in RFC 793, entitled "Transmission Control Protocol," dated September 1981. UDP is described in RFC 768, entitled "User Datagram Protocol," dated August 1980. RTP is described in RFC 1889, entitled "RTP: A Transport Protocol for Real-Time Applications," dated January 1996; and RFC 1890, entitled "RTP Profile for Audio and Video Conference with Minimal Control," dated January 1996.

A frame refers to the duration of a speech sample. For example, a frame may be 10 milliseconds (ms), which indicates that a 10-ms sample of speech is contained in the frame. Other frames include 20 ms, 40 ms, and so forth, samples of speech. Each type of codec can support certain frame sizes. The number of frames that is placed into an RTP payload determines the size of the network packet (e.g., IP packet or other type of packet) used to carry the audio data. During a given call session, the number of frames to be carried in a network packet can be selected. The network packet size has implications on the burden placed on the data network in a given call session. Smaller network packets generally are associated with higher overhead, since more audio data packets are communicated over the data network 20 between terminals. Larger network packets are associated with reduced overhead, but come at the cost of longer delays since a longer speech sample is created between successive transmissions of audio over the data network 20. Thus, selection of network packet size (as determined by the selection of the number of frames to be carried in the packet) may also lead to a conflict between the objectives of higher quality audio and reduced load on the data network 20 and other transmission resources.

In accordance with some embodiments, a call control mechanism implemented in the terminals, call server(s), policy server(s), and/or network monitor(s) of the telephony communications system 10 balances the need for high audio quality as well as the need to reduce burden on the data network 20 and other transmission resources. The call control mechanism selects a supported codec, network packet size, and/or other resource element that takes into account support for the resource element by all communicating terminals, the available capacity of the data network 20 and other transmission resources, and the objective to achieve the highest possible quality of service. Additional or different criteria may be used in other embodiments.

An origination terminal communicates with the call server 12 over the data network 20 for call control signaling (to set up and terminate a call). After a connection is established between terminals over the data network, the terminals communicate media traffic (voice or other audio) and media traffic signaling with each other through the data network 20. The call server 12 performs call setup processing, which includes translation of dialed digits (such as 10-digit telephone number) to an IP address of a destination terminal. The call server 12 also keeps tracks of the status (e.g., busy, idle, down, and so forth) of the terminals that it is responsible for. In addition, the call server 12 keeps track of the usage of the transmission facility (the data network 20 and other transmission resources) by the telephony application. As used here, "telephony application" refers to one or more sessions of voice or other audio communications between or among the various terminals.

Referring to the examples of FIGS. 2–5, processes for establishing a call between an origination terminal (e.g., the terminal 14, also referred to as terminal P1) and a destination terminal (e.g., the terminal 16, also referred to as terminal P2) are illustrated. In the embodiments of FIGS. 2–5, the call server 12 does not access the network monitor to select resource elements. An embodiment which does is described in connection with FIGS. 7A–7B and 8.

Figure 3:
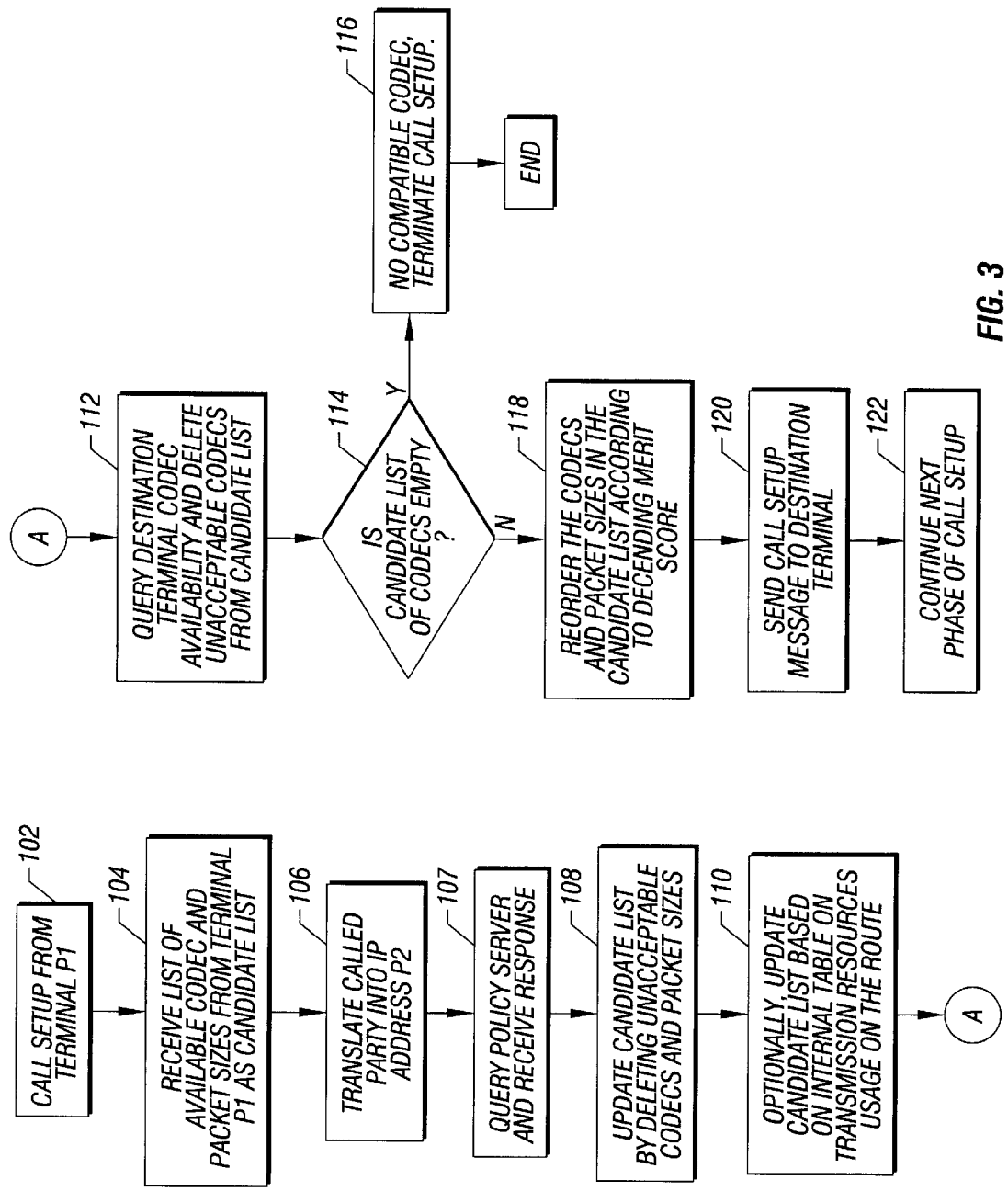
FIG. 3 is a flow diagram of tasks performed by a call server in response to a call request in accordance with one embodiment.

FIG. 2 illustrates the messages communicated between the various entities involved in call establishment, and FIG. 3 illustrates the tasks performed by the call server 12 in the call establishment process according to one embodiment. To start a call, the origination terminal 14, which has an IP address P1, sends a call request, such as a Call_Setup message, which is received (at 102) by the call server 12. The Call_Setup message includes a number identifying the destination terminal, a codec list including the codecs that are supported by the terminal 14, a list of supported packet sizes, and/or a list of other supported resource elements. Supported packet sizes are determined by the number of frames and the size of each frame (e.g., 10-ms frame 20-ms frame, and so forth). Example codecs that are supported include G.711, G.728, G.729, G.729A, G.723.1, and G.722 codecs. The G.711 codec communicates uncompressed audio data and requires a 64-kbps data transfer rate, whereas the other codecs provide varying levels of data compression with lower data transfer rate requirements. For example, the G.728 codec requires a 16-kbps transfer rate, the G.729 codec requires an 8-kbps transfer rate, and the G.723.1 codec requires a transfer rate of 6.3 kbps, 5.3 kbps, or less.

In the call server 12, the list of available codecs and list of supported packet sizes in the Call_Setup message are received (at 104) and combined into a candidate list. Alternatively, the different lists of resource elements may be maintained as separate candidate lists.

Based on the Call_Setup message, the call server 12 translates (at 106) the number (e.g., the dialed number) of the called party into an IP address (e.g., address P2 of the destination terminal 16). Next, the call server 12 sends (at 107) a query message to the policy server 18. The query message includes the IP addresses of the origination and destination terminals (P1, P2) and a request for the usage policy for a telephony application between the pair of terminals at the present time.

The policy server 18 responds to the query by sending a reply message back to the call server 12 to indicate the usage policy for the terminals P1 and P2 for the present call session. The usage policy information may be in the form of predetermined values representing different levels of target usage for telephony communications. Alternatively, the usage policy information may be in the form of information identifying resource elements that are supported or not supported at the present time. Based on the received usage policy information, the call server 12 updates (at 108) the candidate list by deleting unacceptable codecs. The policy server 18 may set a low usage level for the telephony application because of high traffic carrying traditional data packets (e.g., e-mail traffic, web browsing traffic, file transfer traffic, and so forth). Thus, codecs that have high bandwidth requirements may be deleted (at 108) from the candidate list. Examples of such high bandwidth codecs include the G.711 codec. In addition, unacceptable packet sizes are also deleted from the candidate list (at 108), depending on the usage policy. If low usage level is indicated, then shorter packet sizes may be deleted from the list. Thus, the call server 12 selects one or more resource elements (e.g., codecs and packet sizes) that are supported based on the usage policy of the data network 20.

Optionally, the call server 12 can also perform an additional bandwidth restriction based on the usage of transmission resources. Each connection between a pair of terminals shares a pool of transmission resources (links coupling the terminals that the call server 12 is responsible for, routers and gateways coupling the links, and other resources) with other applications. The call server 12 keeps track of the usage of the pool of transmission resources by tracking the number of voice calls and bandwidth usage. When the usage reaches a predetermined threshold, the call server 12 may further limit the bandwidth usage. The call server 12 may use this limitation to further delete (at 110) unacceptable codecs, packet sizes, and other resource elements from the candidate list so that a further reduced number of resource elements may be selected.

The call server 12 then sends (at 112) a query message, e.g., a Query_Resource_Availability message, to the destination terminal P2 to identify the supported codecs, packet sizes, and other resource elements in the destination terminal P2. The results are returned in a Reply_Resource_Availability message, from which the call server 12 can determine the codecs, packet sizes, and other resource elements supported by the destination terminal P2. The candidate list of codecs, packet sizes, and other resource elements is updated based on the available codecs in the destination terminal P2, with unsupported codecs, packet sizes, and other resource elements deleted from the candidate list.

Potentially, all codecs or packet sizes may have been deleted from the candidate list. If either the list of codecs or the list of packet sizes is empty (as determined at 114), then no supported codec or packet size exists to allow a call to proceed between the terminals P1 and P2, at which point the call server 12 sends (at 116) a message to terminate the call setup. The call server 12 also informs the origination terminal P1 of the setup failure.

If at least one codec and at least one packet size is available in the candidate list, then the call can proceed. If two or more codecs are present in the candidate list, then the codecs are reordered (at 118) by applying a merit-based codec ranking algorithm to rank the codecs in the candidate list in the descending merit order (described further below). Packet sizes may also be ordered according to a merit ranking algorithm, as may other resource elements. The codec, packet size, and other resource element having the highest relative rank is selected. Alternatively, selection may be performed by the terminals, which may be adapted to select the highest ranking resource elements from a list.

Next, the call server 12 sends (at 120) a Call_Setup message to the destination terminal P2, with the Call_Setup message including an identifier of the calling party (either the calling terminal's telephone number or its IP address), the selected codec, packet size, and other resource element. The call server 12 then proceeds (at 122) to the remaining tasks to be performed in the call setup, including sending a Selected_Resource message identifying the selected codec, packet size, and other resource element back to the origination terminal P1. Alternatively, the codec, packet size, and other resource element may be communicated as parameters in a Setup_Connection message sent by the call server 12 to connect the call between terminals P1 and P2. A media path is then set up between the terminals P1 and P2.

Although reference is made to selection of several resource elements, it is contemplated that further embodiments may select fewer than all the possible types of resource elements in the call management process. For example, call server 12 may perform selection of only codecs to manage bandwidth usage and quality of service on the data network 20. In addition, if multiple call servers are present in the data network 20, then communications may occur between call servers to enable selection of resource elements for establishing a call between terminals controlled by the call servers.

Figure 4:
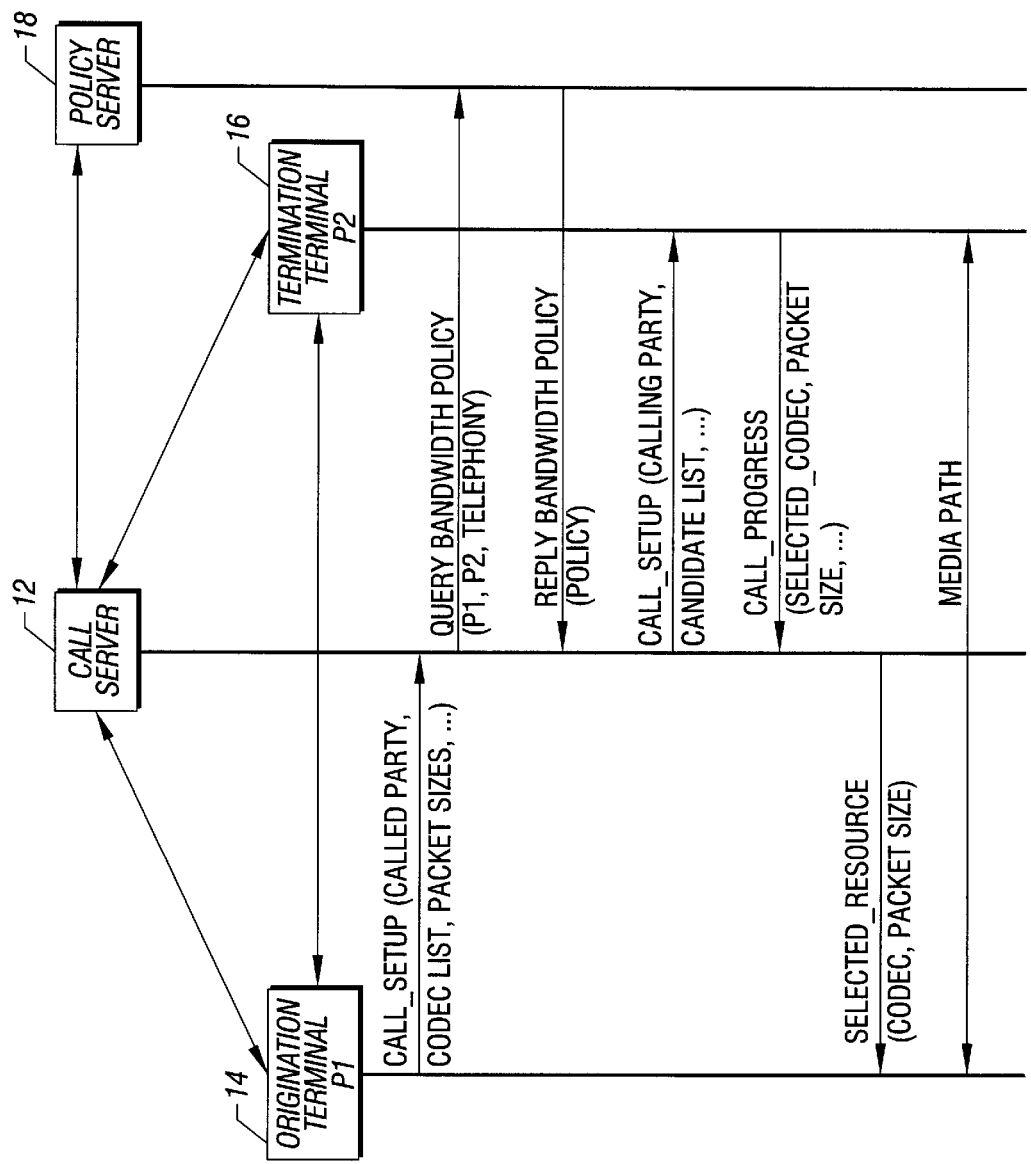
FIG. 4 illustrates the flow for processing a call request between an origination terminal and a destination terminal in accordance with an alternative embodiment.
Figure 5:
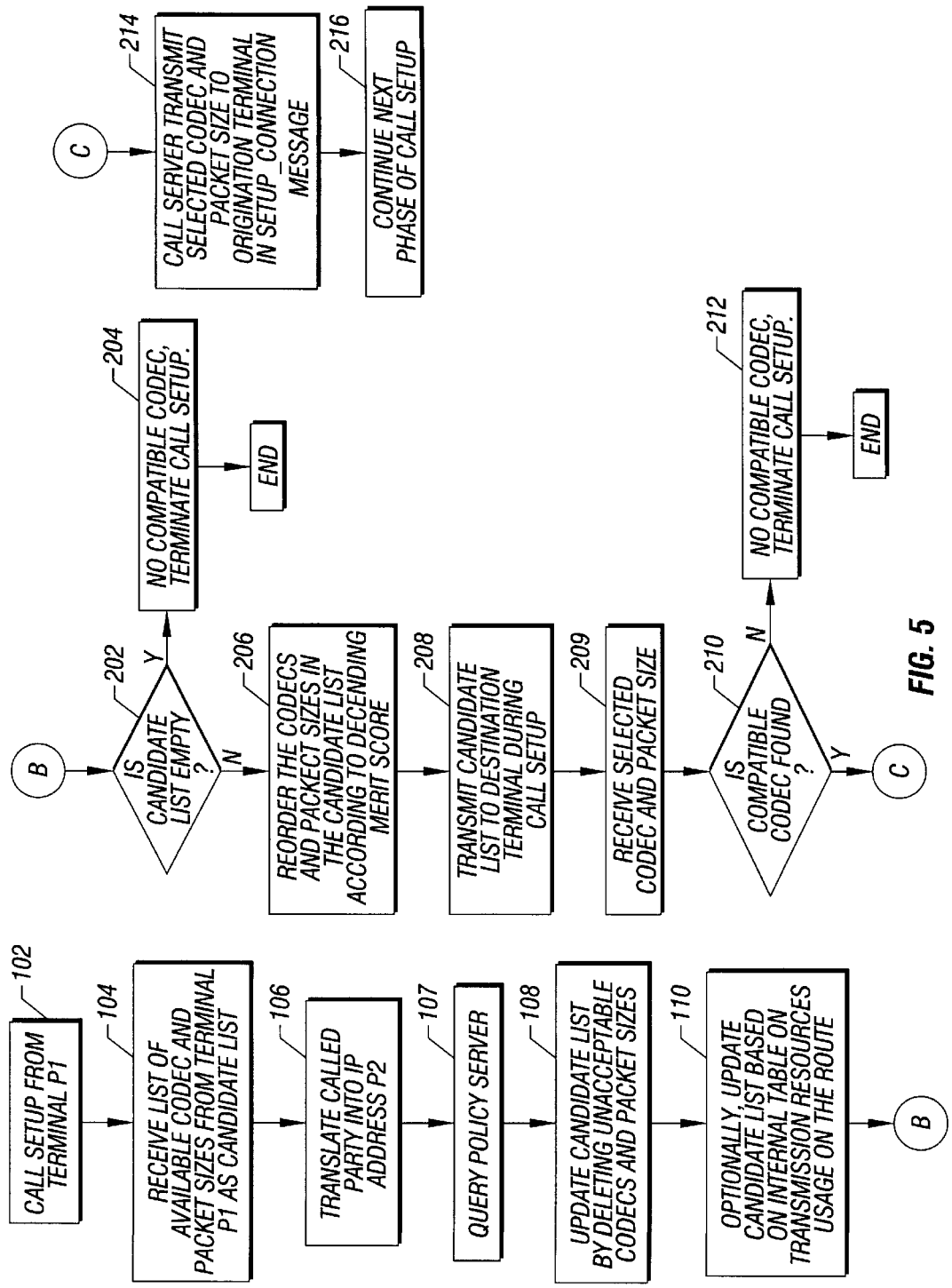
FIG. 5 is a flow diagram of tasks performed by a call server in response to a call request in accordance with the alternative embodiment.

Referring further to FIGS. 4 and 5, another embodiment of performing call establishment in which a codec, packet size, and/or other resource element are selected is illustrated. FIG. 4 illustrates messages exchanged among the entities involved in the call establishment, and FIG. 5 illustrates the tasks performed by the call server 12 in accordance with this embodiment. The tasks performed in the embodiment of FIG. 5 that are common to the tasks performed in the embodiment of FIG. 3 have the same reference numbers. As with the FIGS. 2–3 embodiment, the origination terminal P1 sends a Call_Setup message to the call server 12 that includes a list of available codecs, a list of packet sizes, and a list of other resource elements, which are received in a candidate list (at 104) and updated (at 108) based on the usage policy in the data network 20 for the telephony application as determined from the policy server 18. This candidate list may further optionally be updated based on an internal table in the call server 12 on the usage of transmission resources (at 110). However, instead of querying the destination terminal P2 for its available codecs and supported packet sizes, the call server 12 in this alternative embodiment determines (at 202) if the candidate list is empty at this point. If so, then a capable codec and packet size have not been found and the call setup is terminated (at 204). However, if the candidate list includes at least one codec and at least one packet size, the call server 12 reorders (at 206) the codecs and packet sizes (if more than one of each) in the candidate list according to a descending merit score. The candidate list is sent (at 208) by the caller server 12 to the destination terminal P2 in a Call_Setup message to notify the destination terminal P2 of an incoming call. At this point, the destination terminal P2 may compare the list of its supported codecs to the ones in the candidate list. The destination terminal P2 selects the codec (and other resource elements) having highest relative ranking from the candidate list that is also currently supported by the terminal P2 for the current call. If no capable codec or packet size exists, the destination terminal P2 informs the call server 12 of the rejection. The call server 12 determines (at 210) if a capable codec and packet size has been identified. If not (as determined from receipt of the rejection message from the destination terminal P2), the call setup is terminated (at 212).

However, if a capable codec and packet size are identified, the destination terminal P2 informs the call server 12 of the selected codec through a Call_Progress message or some other message. If the call server 12 determines that a capable codec and packet size have been selected, then the call server 12 transmits the selected codec and packet size (at 214) to the origination terminal P1 in a Setup_Connection message or some other message, such as a Select_Resource message. The call server 12 then proceeds to the remaining tasks to perform for the call setup (at 216), after which a media path is established between the origination terminal P1 and the termination terminal P2 for voice (or other audio) communications.

Variations of the processes described in connection with FIGS. 2–5 may be performed periodically during a call session between two or more terminals. This allows modification of the selected resource element in response to increases or decreases in the available bandwidth of the data network 20 and other transmission resources, including usage of resources in the terminals themselves.

Figure 6:
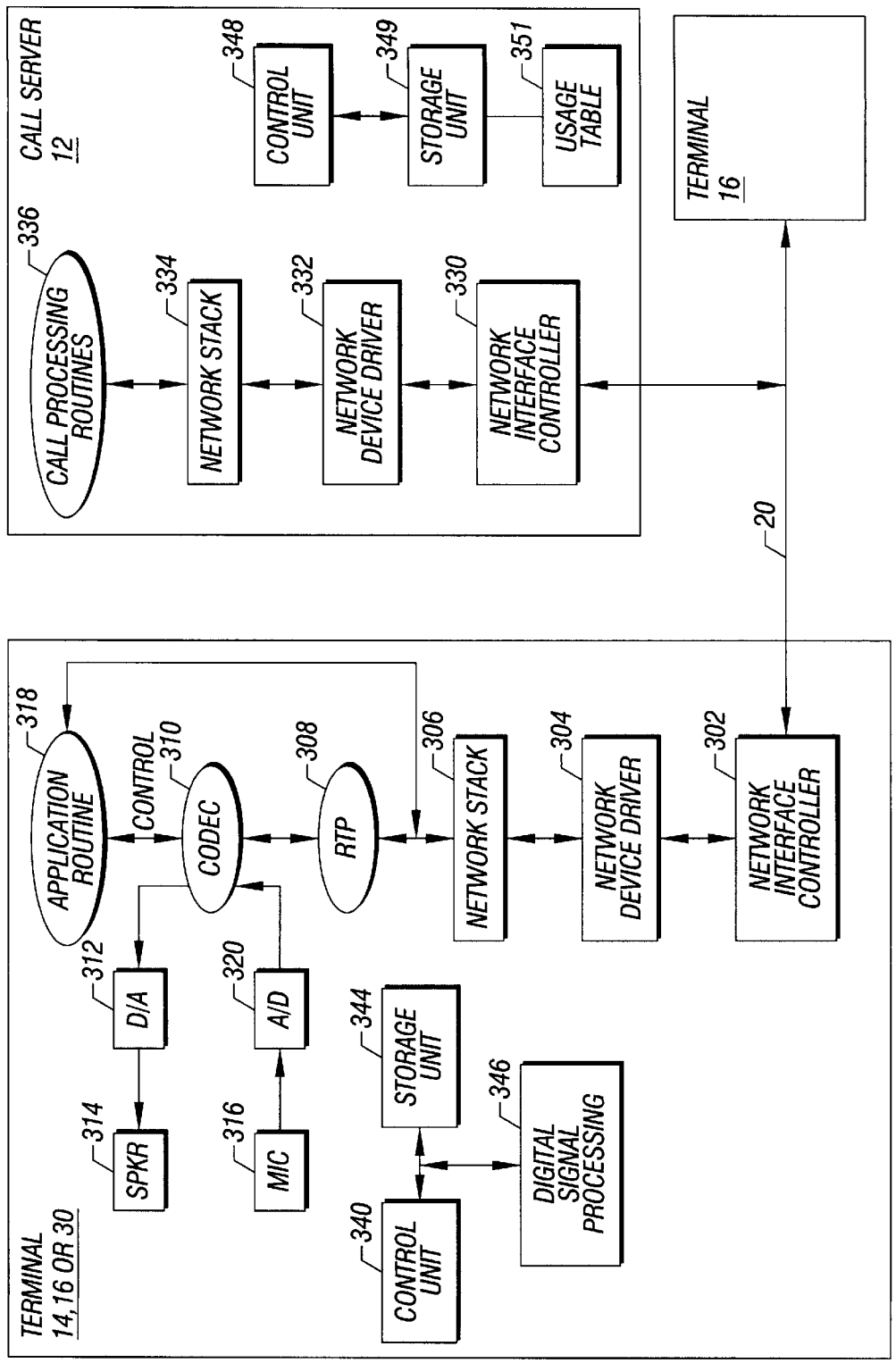
FIG. 6 illustrates components in a terminal and call server of FIGS. 1A–1B.

Referring to FIG. 6, components of an example terminal and call server are illustrated. In FIG. 6, the components of the terminal 14, 16, or 30 and call server 12 are illustrated. As noted above, the terminal 14, 16, or 30 can be one of many types of devices capable of communicating voice over the data network 20. These terminals may include computer systems, telephones that are configured to communicate over a data network, a gateway system to the public switched telephone network (PSTN), and other communications devices.

The layers of the terminal 14, 16, or 30 include a network interface controller 302 that is coupled to the data network 20. Above the network interface controller 302 is a network device driver 304 and a network stack 306, such as a TCP/IP or UDP/IP stack. Above the network stack 306 is an RTP layer 308 that performs various tasks associated with real time communications such as telephony communications. Incoming data from the data network 20 is received through the layers 302, 304, 306 and 308 and routed to an audio codec 310, which has been selected from a number of available codecs as discussed above. The incoming data is decoded by the codec 310 and routed to a digital-to-analog (D/A) converter 312 to produce the output at a speaker 314. Outbound data to the network 20 originates at a microphone 316 and/or from an application routine 318. A user can speak into the microphone 316 to communicate voice data over the data network 20. Alternatively, the application routine 318 (or some other routine) may generate voice or other audio data to be transmitted to the data network 20. Examples of this may include an automated answering application, such as a voice mail application or a voice prompt application from which users can select to access to various services.

From the microphone, audio signals are passed through an analog-to-digital (A/D) converter 320, which digitizes the audio signals and passes the digital audio data to the codec 310. The codec 310 encodes the data and transmits the coded data down layers 308, 306, 304, and 302 to the data network 20. The audio traffic is communicated through the data network 20 to another terminal to which the terminal 14, 16, or 30 has established a call connection.

In addition to the audio traffic path, a control path exists between the terminal 14, 16, or 30 and the call server 12 to set up, maintain, and terminate voice calls over the data network 20. In the terminal 14, 16, or 30 one or more application routines 318 may generate control messages that are transmitted to the call server 12 through the network stack 306, network device driver 304, network interface controller 302, and the data network 20. Control signaling from the call server 12 is similarly received through the same layers from the data network 20 back to the one or more application routines 318.

In the call server 12, similar layers may exist. A network interface controller 330 in the call server 12 is coupled to the data network 20. Above the network interface controller 330 is a network device driver 332 and a network stack 334, such as a TCP/IP or UDP/IP stack. One or more call processing routines 336 in the call server 12 control the management of calls between terminals that are assigned to the call server 12. The call processing routines 336 perform the establishment of calls, maintenance of calls, and termination of calls. The call processing routines 336 may also periodically determine the available usage of the data network 20, which may cause it to update the codec and packet size used by the terminals in the voice communication session over the data network 20. For example, the call server 12 may maintain a usage table 351 to keep track of the number of active telephony calls and the usage (based on selected resource elements).

In each terminal and call server, various software routines or modules may exist, such as the one or more application routines 318, network stack 306, and device driver 304 in the terminal 14, 16, or 30 and the one or more call processing routines 336, network stack 334, and device driver 332 in the call server 12. Instructions of such software routines or modules, and others, may be stored in storage units 344 and 349 in the terminal and call server, respectively. The storage units 344 and 349 may include machine-readable storage media including memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs).

The instructions may be loaded and executed by control units 340 and 348 in the terminal and call server, respectively, to perform programmed acts. The control units 340 and 348 may include microprocessors, microcontrollers, application-specific integrated circuits (ASICs), programmable gate arrays (PGAs), or other control devices. The terminal 14, 16, or 30 may also include a digital signal processor 346 for performing arithmetic intensive operations such as compression and decompression operations performed by the audio codec 310.

The instructions of the software routines or modules may be loaded or transported into a system or device in one of many different ways. For example, code segments or instructions stored on floppy disks, CD or DVD media, the hard disk, or transported through a network interface card, modem, or other interface mechanism may be loaded into the system or device and executed as corresponding software routines or modules. In the loading or transport process, data signals that are embodied as carrier waves (transmitted over telephone lines, network lines, wireless links, cables, and the like) may communicate the code segments or instructions to the system or device.

The following discusses the merit-based codec ranking in accordance with one embodiment. A modified ranking system may be provided for packet size and/or other resource element selection. The call server 12 maintains a table of characteristics of each codec including the following attributes: voice quality (Q), bandwidth usage (B), and terminal DSP (e.g., digital signal processor 346 in FIG. 6) resource usage (R). The Q, B, and R attributes may contain numeric values (ranging between 0 and 1). The attribute B in one embodiment may represent the inverse of the actual bandwidth usage, that is, a higher B value indicates low bandwidth usage and a low B value indicates high bandwidth usage. A higher value of R indicates lower consumption of DSP resources. The attribute R similarly represents the inverse of the actual DSP usage. A merit factor M can be computed for each codec in the candidate list as a linear combination of the attributes Q, B, and R according to the following equation:

$$M = W_Q * Q + W_B * B + W_R * R,$$

where $W_Q$, $W_B$, and $W_R$ are weights that are assigned to the attributes Q, B, and R, respectively. The values of the weights $W_Q$, $W_B$, and $W_R$ may be dynamic and can be based on usage of the pool of transmission resources used for the telephony application. Thus, in one example embodiment, the values of the weights $W_Q$, $W_B$, and $W_R$ may be assigned as following:

$$W_Q = (1-t) * 0.8, \ W_B = t, \ \text{and} \ W_R = (1-t) * 0.2,$$

where t is the percentage usage of the pooled transmission resources for the telephony application. The codecs in the candidate list may be arranged in descending order of the merit factor M in one embodiment, from which a codec can be selected for use in the call to be established.

Thus, according to one embodiment, the merit factor M is higher for codecs having relatively high audio quality (Q), low expected bandwidth (e.g., data transfer rate) usage (B), and low expected DSP usage (R). Codecs having relatively low audio quality, high expected bandwidth usage, and high DSP usage will have a lower M value. Thus, generally, the value of the merit factor M is increased with higher audio quality and decreased usage of transmission resources (e.g., links in the data network 20 and DSP 346).

As noted above, the telephony communication system 10 includes a network monitor 19 for monitoring various characteristics and conditions of one or more portions of the data network 20. Multiple network monitors may be present for monitoring different portions of the data network 20. The characteristics and conditions monitored include packet delay, jitter, and percentage of packet loss.

The network monitor 19 may perform monitoring of a network link in a number of different ways. One technique is to use a network monitor having two different nodes on a network link. One node of the network monitor can send test packets targeted to the other node in the network monitor 19. From the transmission and receipt (or lack of receipt) of test packets, the nodes of the network monitor 19 can determine the delays in transmissions of packets as well as the percentage of packet loss. The network monitor 19 can periodically communicate test packets to monitor the link on a periodic basis. Such a technique may be referred to as a static monitoring technique.

A dynamic technique to monitor a link is to access routers or gateways that communicate with the link. Routers and gateways maintain management information that keep track of delays being experienced with links that the routers and gateways are coupled to as well as amounts of packets that are being lost. Thus, each time a call server accesses a network monitor to request the current characteristics and conditions of a particular link, the network monitor can issue a query to a particular gateway or router to determine the current conditions.

In further embodiments, the network monitor 19 may also provide end-to-end delay and packet loss information based on the several classes of service that may be supported, such as those in a quality-of-service (QOS) enabled network. For example, if the data network 20 employs differential services (Diffserv) to provide QOS, different classes of packets may be defined based on assigned Diffserv code points (DSCPs). One class of packets may include packets delivering voice or other audio data. Other classes may be defined for other types of data that may be communicated through the data network 20. The different classes of packets may be routed through different queues through network nodes so that higher priority classes of packets are delivered more quickly. The network monitor 19 may track the delays and packet loss information by DSCP, with one DSCP assigned for the voice-over-IP class of service.

Figure 7A:
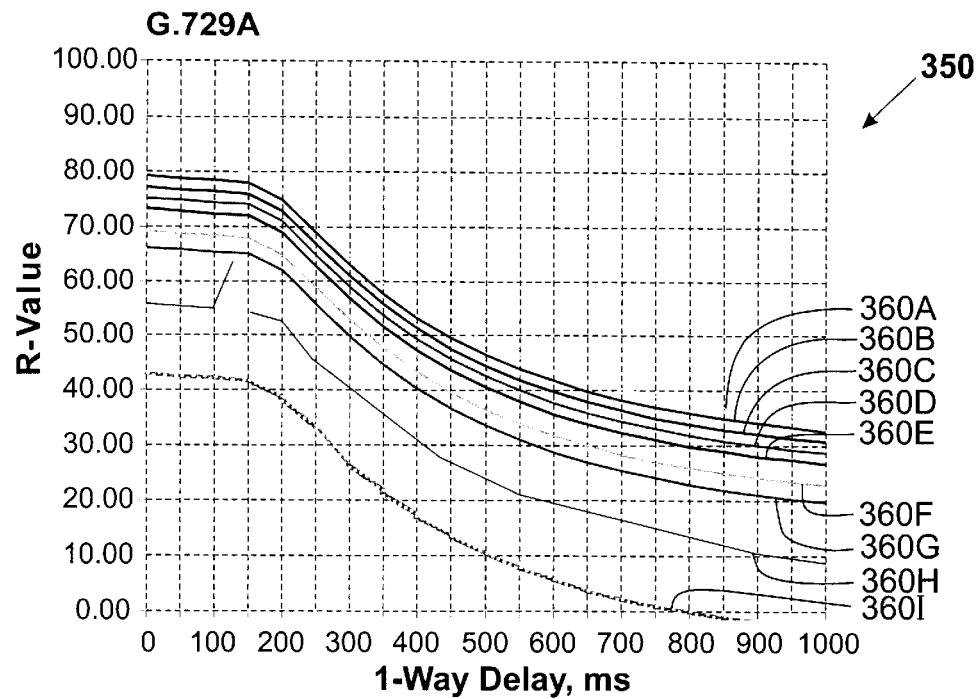
FIGS. 7A–7B illustrate E-model charts that map conditions of a network link to a desired quality of service in accordance with an embodiment.
Figure 7B:
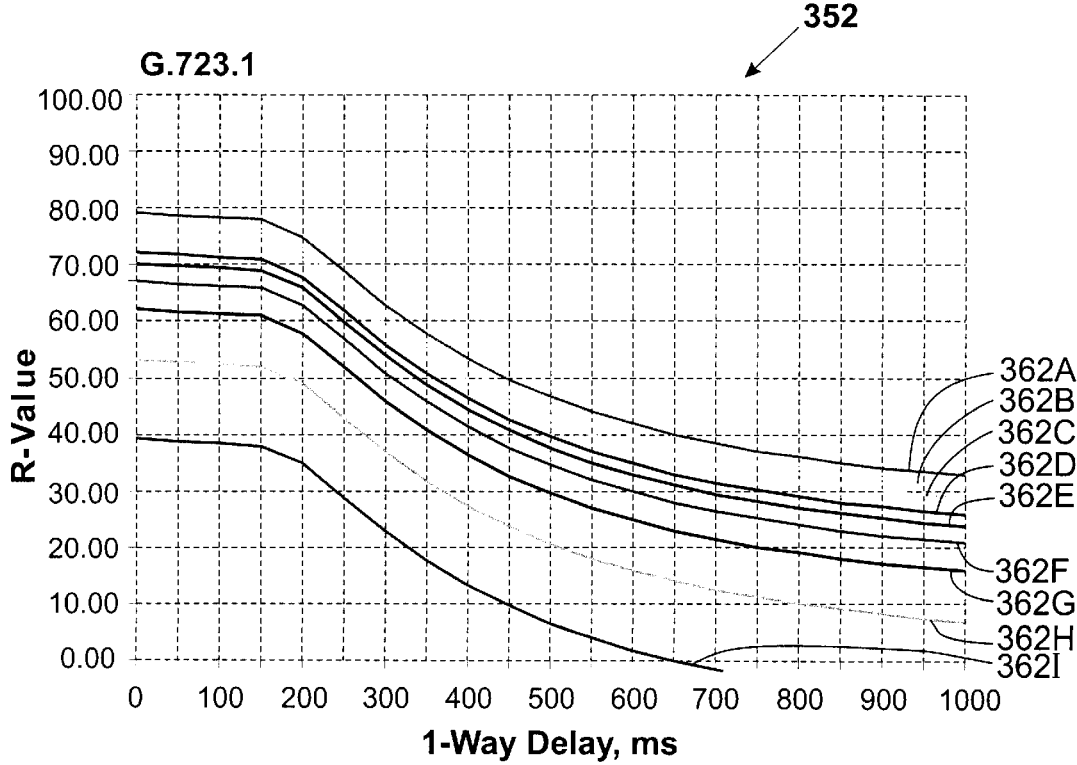

Once the packet delay and loss information is determined by the call server 12, the call server 12 can access a database of models (referred to as E-models) for each call server to determine if a codec can satisfy a desired level of quality based on the prevailing network link conditions. E-models (represented in the form of charts) may also be maintained for the other resource elements. Two E-model charts 350 and 352 are illustrated in FIGS. 7A and 7B for the G.729A and G.723.1 codecs, respectively. Each E-model includes a chart mapping packet delays and percentage of packet loss to a desired quality level. In each E-model chart 350 or 352, an R value represents the desired quality of service. The call server 12 may maintain profiles and policies establishing the desired R-values of calls between different combinations of callers. For example, for internal calls within an organization, a lower quality of service (and therefore lower R value) may be established, whereas external calls are set at higher R values. Other embodiments may use different representations of the quality of audio service of codecs and other resource elements.

In the chart 350 for the G.729A codec, the horizontal axis represents packet delay and the vertical axis represents the R value. The curves 360A–360I represent different percentages of packet losses. In one example, the curve 360A represents a 0% packet loss, the curve 360B represents a 0.5% packet loss, the curve 360C represents a 1% packet loss, the curve 360D represents a 1.5% packet loss, the curve 360E represents a 2% packet loss, the curve 360F represents a 3% packet loss, the curve 360G represents a 4% packet loss, the curve 360H represents an 8% packet loss, and the curve 360I represents a 16% packet loss. Thus, as illustrated in FIG. 7A, the higher the delay and percentage packet loss, the lower the R value. In one embodiment, an R value of 90 generally indicates that users are very satisfied, an R value of 80 generally indicates that users are satisfied, an R value of 70 generally indicates that some users are dissatisfied, an R value of 60 generally indicates that many users are dissatisfied, and an R value of 50 and below generally indicate that nearly all users are dissatisfied with the level of service.

The chart 352 in FIG. 7B for the G.723.1 codec is similar to the chart 350 in FIG. 7A, with the curves 362A–362I representing corresponding percentages of packet loss to curves 360A–360I in FIG. 7A. Thus, given the current packet delay and percentage of packet loss, the charts of the E-models for the various codecs may be accessed to determine which codec can support the desired R value. In further embodiments, different models may be used for codec or other resource element selection.

Figure 8:
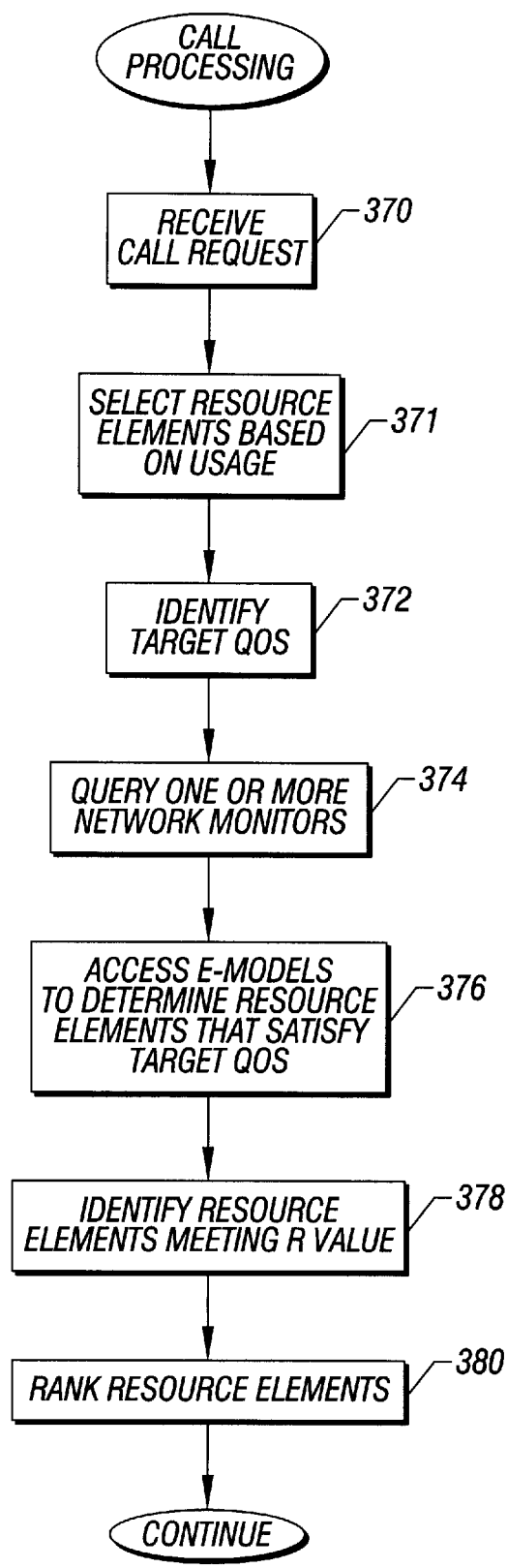
FIG. 8 illustrates a flow for processing a call request in accordance with an embodiment that utilizes the E-model charts of FIGS. 7A–7B.

Thus, referring to FIG. 8, in accordance with an alternative embodiment that uses E-model charts, such as 350 and 352, the call server 12 receives (at 370) a call request from an origination terminal. The call request may identify the resource elements, including codecs, supported by the origination terminal. The call server can perform (at 371) selection of the codecs and other resource elements based on the usage policy and usage of transmission resources, including the data network 20, as described above in connection with FIGS. 2–5. This may reduce the number of codecs and other resource elements.

Further, based on the profiles and policies associated with the identified origination and destination terminals in the call request, the call server identifies (at 372) the target quality of service (R value). Next, the call server 12 can send (at 374) query messages to the network monitor 19 to determine the current characteristics and conditions of the network 20, including network delay and packet loss. Based on the identified delay and packet loss information, the call server 12 accesses (at 376) the E-model charts of the supported codecs. From the E-model charts, the call server 12 identifies (at 378) the codecs and other resource elements that satisfy the target R value. Next, the codecs and other resources may be ranked (at 380) as described above based on various merit attributes to enable selection of one of the codecs and other resource elements to use during the call, as described above.

Some embodiments of the invention may provide one or more of the following advantages. A flexible codec (and other resource element) selection strategy is provided to enforce a policy based on the codec data rate between a pair of terminals where the codec (and other resource element) selection takes into account the capacity and resource limitation of the terminals as well as network traffic load and actual transmission resource usage in each terminal. Selection of resource elements may also be based on the prevailing characteristics and conditions of the network, such as delay and packet loss. Fine policy control over telephony traffic over a data network is made available. Selection may be biased towards high voice quality when traffic is light; however, if other network traffic high, then voice quality may be reduced to reduce the load on the data network.

The codec and other resource element selection technique and apparatus may be used with other applications. For example, for video conferencing communications sessions over a packet-based data network, selection of video codecs may also be used to reduce load on the data network.

Another aspect of managing telephony communications over a data network is call admission control. A call admission procedure determines whether to accept a call request from an origination terminal. If a data network, or any portion of the data network, has become saturated with traffic (both audio and traditional data packet traffic), then further call requests may be denied to ensure some predetermined quality of service. According to one embodiment of the invention, call admissions is based on usage of links between different groups of terminals (with the groups referred to as communities). Each community includes multiple terminals that are capable of communicating with each other without being subjected to call admissions control. This is made possible by grouping terminals that are coupled to high capacity links, such as LANs. As used here, a community refers to a group of terminals that are coupled by links having relatively high bandwidth. Such terminals may be located geographically close to each other or they may be located over large distances.

Within each community, voice calls between terminals are allowed to proceed when requested. In one embodiment, to provide some limitation on bandwidth usage of the communication link within each community, resource element selection (such as the codec and packet size selection described above) may be used to limit the bandwidth of each call session when large numbers of call sessions are present in the community. In other embodiments, resource selection may be skipped for intra-community calls. The call admission control in some embodiments of the invention is provided for calls made between communities based on usage of the links among the communities.

Figure 9:
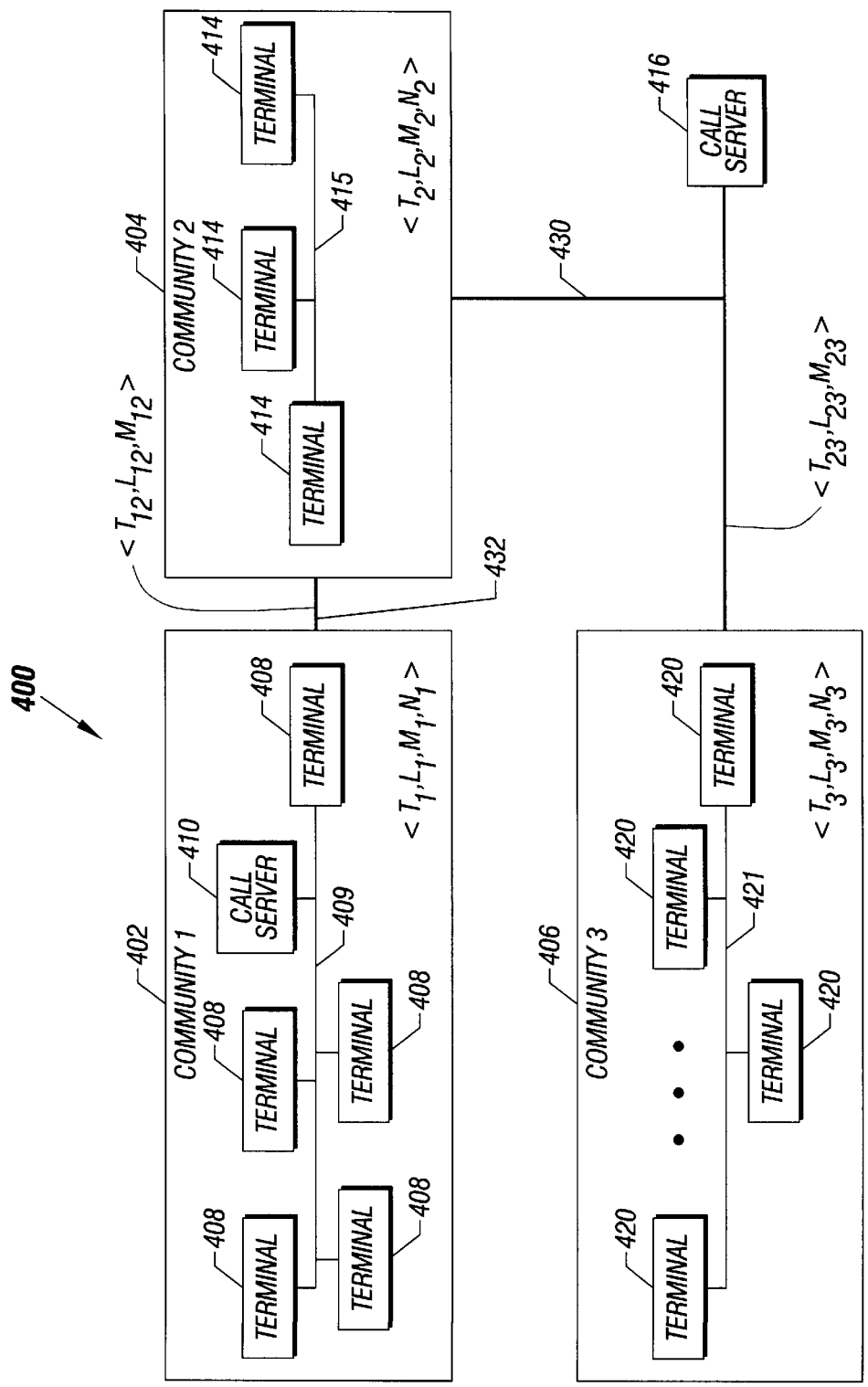
FIG. 9 illustrates a telephony communications system that includes a plurality of communities and links between the communities over which call admission control is performed in accordance with an embodiment.

Referring to FIG. 9, one arrangement of a voice communication system 400 that includes communities is illustrated. The illustrated multiple links between terminals are logical links, not physical links. The logical links are part of the overall data network, with each link corresponding to a path through the data network between any two terminals. In FIG. 9, each of the three communities 402, 404, and 406 includes its set of terminals. In the community 402, terminals 408 are coupled to a link 409 (e.g., a LAN, WAN, or other network). A call server 410 is also coupled to the link 409 to manage calls between or among the terminals 408 and between one or more of the terminals 408 and a terminal external to the community 402. The first community 402 is coupled to the second community 404 over a link. In the second community 404, terminals 414 are coupled to an internal link 415. The second community 404 is coupled over another external link 430 to a third community 406. An internal link 421 in the community 406 is connected to terminals 420. In the illustrated embodiment, the second and third communities 404 and 406 share a call server 416, which manages calls within each of, or between, the communities 404 and 406 as well as between a terminal in one of the communities 404 and 406 and another community, such as community 402. Each server maintains a list of its assigned communities and terminals in each of those communities.

Generally, the links 430 and 432 (and other external links connecting communities) have lower bandwidths than the internal links in each of the communities. However, it is contemplated that exceptions to this exist where an external link may have higher bandwidth than an internal link. For a given community I, the following parameters may be defined: $L_I$, which represents the limit on a total available bandwidth between the community and a device or system external to the community; $M_I$, which represents the threshold at which reselection of a codec, packet size, or other resource element is performed to reduce load on a link in a community; $N_I$, which represents a threshold to restrict outgoing calls; and $T_I$, which represents the usage of the transmission resources in the community.

Thus, according to one embodiment of a call admission control, outgoing new call requests from the community I may be denied if the value of $T_I$ exceeds the threshold $N_I$. If the traffic $T_I$ exceeds the threshold $M_I$, then the call server for the community I can start to perform codec and other resource selection to reduce traffic. Thus, as described above in connection with FIGS. 2–5, a call server may discard codecs and/or other resource elements based on transmission resources that the call server monitors, including the several thresholds $L_I$, $M_I$, and $N_I$ of the community I. In one embodiment, the value of $M_I$ is about 60% to 80% of $L_I$. The value of $N_I$ can be set at a value closer to or at $L_I$.

Further, a pair-wise limit can be added for call admission control between communities. In this embodiment, for a given community link between two communities I and J, the following parameters may be defined: $L_{IJ}$, which represents the limit on a total bandwidth to be used by the community link IJ for the telephony application; $M_{IJ}$, which represents the threshold at which resource element selection is performed; and $T_{IJ}$, which represents the usage of transmission resources of the community link IJ. A community link does not have an N parameter since a link has no direction and the concept of incoming or outgoing calls does not apply.

For a terminal in community I to establish a new call with a terminal in community J, the following must be satisfied:

$T_I < N_I$ and $T_{IJ} < L_{IJ}$.

The first clause essentially states that the traffic between community I and all other communities must be less than the threshold limit $N_I$. The value of $T_I$ is the sum of all traffic between community I and all other communities, that is $$T_I = \sum_{allK} T_{IK}.$$

The second clause ($T_{IJ} < L_{IJ}$) specifies that the traffic on the link IJ between communities I and J must be less than the threshold $L_{IJ}$. If either of the two clauses are not satisfied, then the call request from a terminal in community I is denied. A threshold $M_{IJ}$ is also specified for the link IJ between communities I and J to specify a limit at which resource selection is performed.

The limits $L_I$, $L_{IJ}$, $M_I$, and $M_{IJ}$ may be static (that is, they remain fixed) or adaptive (that is, they may change with changing conditions of the data network). For example, as the data network traffic increases, the threshold values may decrease. The call server can collect statistics regarding the network (such as by accessing a network monitor or other node such as a router or gateway) to determine the conditions of the network. Based on the conditions, e.g., large delays or packet losses, the threshold values may be decreased to maintain high quality of service.

As illustrated in FIG. 9, the first community 402 has the following parameters: $T_1$, $L_1$, $M_1$, $N_1$; the second community 404 has the following parameters: $T_2$, $L_2$, $M_2$, and $N_2$; and the third community 406 has the following parameters: $T_3$, $L_3$, $M_3$, and $N_3$. The community link 432 has the following parameters: $T_{12}$, $L_{12}$, $M_{12}$; and the community link 430 has the following parameters: $T_{23}$, $L_{23}$, and $M_{23}$.

Figure 10A:
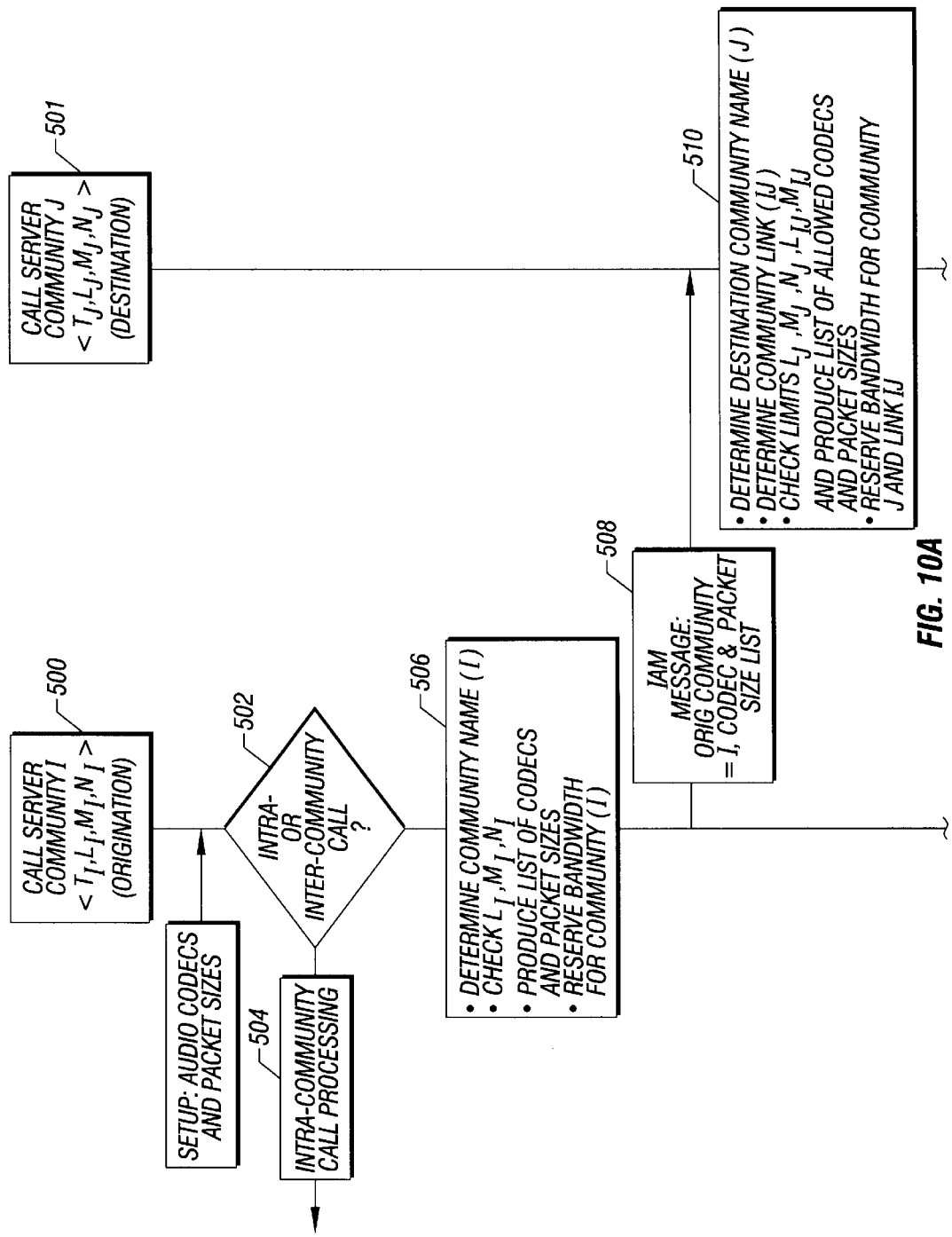
FIGS. 10A–10B illustrate the flow for managing a call request between terminals in different communities of FIG. 9.
Figure 10B:
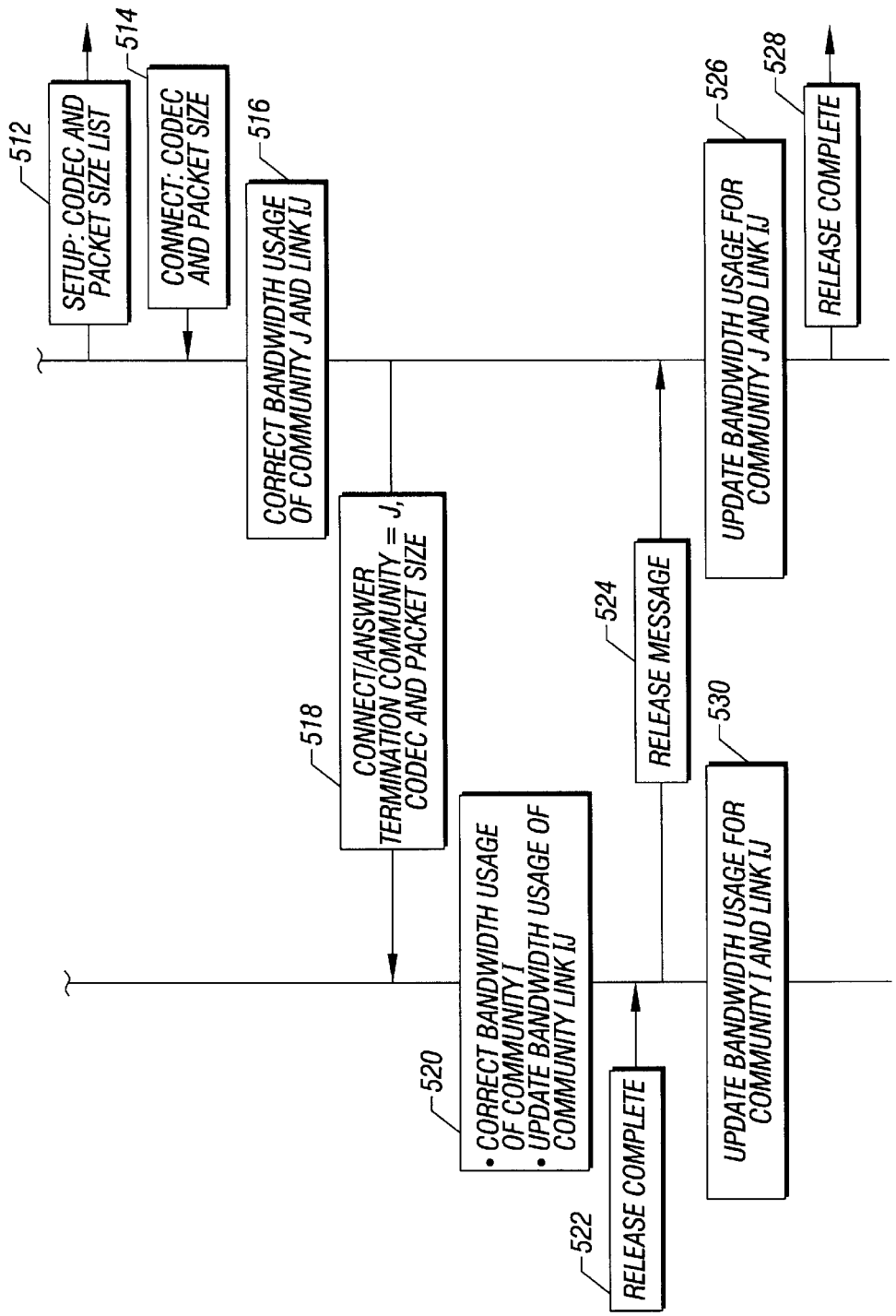

Referring to FIGS. 10A–10B, the call admissions control procedure is illustrated for a call between an origination terminal in one community (community I) and a destination terminal in a second community (community J). In the example of FIGS. 10A–10B, a first call server 500 services community I and a second call server 501 services community J. The call server 500 receives a Call_Setup message from a terminal in community I that includes a list of supported audio codecs and a list of supported packet sizes. The call server 500 then determines (at 502) whether the call is an intra-community or an inter-community call. If the call is an intra-community call, then the call server 500 in community I performs intra-community call processing and exchanges messages between the terminals involved in the call session (at 504). Codec and other resource element selection may be performed as described above if the traffic $T_I$ exceeds the threshold value $M_I$.

If the call is an inter-community call, then the call server 500 determines (at 506) the name of the origination community, in this case community I. The call server 500 then checks the attributes $L_I$, $M_I$, and $N_I$ of the community I. At this point, the call server 500 checks the traffic $T_I$ (between community I and all other communities) against the limit $N_I$. If $T_I$ exceeds $N_I$, then the call is denied by the call server 500. However, if the call request is allowed to proceed, then a candidate list of codecs and packet sizes is then created. Such a list of codecs and packet sizes may be further restricted based on the values of the thresholds $L_I$, $M_I$, and $N_I$. The bandwidth for community I is reserved to reserve capacity for the requested call. This allows the call server 500 to monitor the available bandwidth for further inter-community call requests from terminals in the community I.

A call request message is sent (at 508) from the call server 500 to the call server 501 that is assigned to community J. The message includes the name of the origination community I as well as the candidate list of codecs and packet sizes. In response to the message from the call server 500, the call server 501 determines the destination community name J, the community link IJ, and checks the limits $L_J$, $M_J$, and $N_J$, $L_{IJ}$ and $M_{IJ}$ (at 510). Such a check includes checking if value of $T_{IJ}$ exceeds $L_{IJ}$. Also, the value of $T_J$ (total traffic of inter-community calls between community J and all other communities) is evaluated against $L_J$. If $T_J$ exceeds $L_J$ or $T_{IJ}$ exceeds $L_{IJ}$, then the call is denied and the call server 501 informs the call server 500 of the call termination. The call server 501 may also check $T_{IJ}$ against $M_{IJ}$, and $T_J$ (total traffic from community J) against $M_J$, to determine if resource selection is needed.

From the limits, the call server 501 may further restrict the list of allowed codecs and packet sizes. Bandwidth is then reserved for the community J and link IJ for the requested call. The call server 501 then sends a Call_Setup message (at 512) to the destination terminal in community J. The Call_Setup message includes the codec and packet size candidate list. In response to the Call_Setup message, the destination terminal sends back a Call_Connect message (at 514) that identifies a selected codec and a packet size. The call server 501 and destination terminal may select a codec and packet size using techniques described in connection with FIGS. 2–5, which uses a ranking algorithm. Based on the returned Call_Connect message identifying the selected codec and packet size, the call server 501 corrects (at 516) the expected bandwidth usage of community I and link IJ. The call server 501 then sends back (at 518) a Connect/Answer message to the call server 500 that includes an identification of the termination community link (J) and the selected codec and packet size. Based on the identification of the selected codec and packet size, the expected bandwidth usage in the community I for the call session is corrected, and the expected bandwidth usage of the community link IJ is updated (at 520).

At this point, a call has been connected between the origination terminal and the destination terminal in communities I and J, respectively. If the origination terminal desires to terminate the phone call, then it sends a release message (at 522) to the call server 500. In response, the call server 501 updates (at 530) its bandwidth usage of community I and link IJ and sends a release message (at 524) to the call server 501. In response to the release message, the call server 501 updates (at 526) the bandwidth usage for community J and link IJ to reflect termination of the call. The call server 501 sends a release complete message (at 528) to the destination call server to terminate the call.

In some cases, it is easy to determine whether or not a call is intra-community or inter-community. For example, the translation component in a call server can be equipped with information indicating whether or not the call request is for an intra-community call. However, in some other cases, the origination terminal's call server cannot accurately determine if a call request is for an intra- or inter-community call. For example, although a call request may identify a destination terminal in another community, the destination terminal may have forwarded the call back to a terminal in the origination community. In this case, the origination terminal's call server may assume that the call is an inter-community call and delete any codecs and other resource elements from the candidate list based on the origination terminal's community threshold values. However, the call may still be determined to be an intra-community call by a second call server associated with the assumed destination terminal. The second call server may determine that the call has been forwarded back to the community of the origination terminal. Thus, in an embodiment in which intra-community calls are not subject to resource element selection, the call request should not be denied even if the resulting candidate list is empty since the call may be forwarded back to the origination terminal's community for an intra-community call. However, if the call is indeed inter-community, and the candidate codec list is empty, then the call is denied by the second call server.

A call management method and apparatus has been described to offer call admissions control and selection of resource elements to more effectively manage usage of a data network for telephony communications while providing a higher quality of service.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of managing calls over a data network, comprising:

determining usage information of the data network;

receiving a call request for establishing a call between at least two network terminals; and selecting one or more of a plurality of resource elements as candidates for use in the requested call in response to the call request based on usage information of the data network, wherein the resource elements define one or more characteristics of data exchanged between the network terminals, wherein the selecting includes selecting one or more resource elements based on usage policy set by a policy server.

2. A method of managing calls over a data network, comprising:

determining usage information of the data network;

receiving a call request for establishing a call between at least two network terminals;

selecting one or more of a plurality of resource elements as candidates for use in the requested call in response to the call request based on usage information of the data network, wherein the resource elements define one or more characteristics of data exchanged between the network terminals;

receiving information relating to the plurality of resource elements during establishing of the call; and selecting one or more of the plurality of resource elements based on support for the one or more resource elements in each of the at least two network terminals.

3. A method of managing calls over a data network, comprising:

determining usage information of the data network;

receiving a call request for establishing a call between at least two network terminals;

selecting one or more of a plurality of resource elements as candidates for use in the requested call in response to the call request based on usage information of the data network, wherein the resource elements define one or more characteristics of data exchanged between the network terminals; and ranking the resource elements according to merit based on quality of the requested call and expected bandwidth usage of the data network.

4. The method of claim 3, wherein the ranking of the resource elements is further based on expected usage of a digital signal processing element of each terminal.

5. A method of managing calls over a data network, comprising:

determining usage information of the data network;

receiving a call request for establishing a call between at least two network terminals;

selecting one or more of a plurality of resource elements as candidates for use in the requested call in response to the call request based on usage information of the data network, wherein the resource elements define one or more characteristics of data exchanged between the network terminals; and performing call admissions control to accept or deny the call request, wherein the at least two terminals are defined in at least two communities coupled by a link, and wherein performing call admissions control includes performing call admissions control based on a threshold set for the link between the communities.

6. The method of claim 5, wherein performing call admissions control is based on usage of a link in the data network between groups of terminals.

7. The method of claim 5, further comprising bypassing the call admissions control for an intra-community call within each community.

8. A server for managing calls in a system having a network, comprising:

an interface to the network to receive a call request to establish a call between two endpoints on the network; and a control unit adapted to process the call request and to control selection of one or more of a plurality of resource elements as candidates to be employed by the endpoints in the call based on usage of the network, wherein the resource elements comprise at least one of codecs to be employed by the endpoints in the call and sizes of messages to be used for carrying audio data in the call, wherein the control unit is adapted to rank the resource elements by one or more predetermined criteria, wherein the control unit is adapted to present the ranked resource elements to at least one of the endpoints for the at least one endpoint to select a resource element.

9. The server of claim 8, wherein the control unit is adapted to select the resource element having a highest relative rank.

10. The server of claim 9, wherein the control unit is adapted to determine resource elements supported by the endpoints.

11. An article including one or more machine-readable storage media containing instructions to manage calls within a telephony system, the instructions when executed causing a controller to:

receive a call request containing information identifying an origination endpoint, a destination endpoint, and one or more resource elements supported by the origination endpoint;

select one or more of the one or more resource elements based on perceived audio quality and usage of a data network;

present the selected one or more resource elements as available for use in a call between endpoints; and receive information relating to the one or more resource elements during call establishment.

12. A method of managing calls in a telephony system, comprising:

defining a plurality of communities each including one or more communication endpoints;

assigning at least first and second usage threshold values to a link between communities; and processing a call request based on the usage threshold values, wherein the processing includes determining whether to admit the call request over the link based on the first usage threshold value, wherein the processing further includes selecting one or more resource elements to be used during a call session between endpoints over the link based on the second usage threshold value, wherein the processing includes admitting the call request over the link and performing selecting of the resource elements if usage over the link exceeds the second usage threshold value but is less than the first usage threshold value.

13. The method of claim 12, wherein the assigning includes assigning a threshold value indicating the available bandwidth on the link between the communities.

14. The method of claim 12, wherein the assigning includes assigning a usage threshold value over which further outgoing calls from a community is prohibited.

15. A call establishment method, comprising:

determining a candidate list of coding resource members associated with a call request;

checking a usage policy for the call request;

removing from the candidate list a first set of coding resource members whose bandwidth requirements exceed the usage policy;

ranking a second set of coding resource members of the candidate list according to merit, the second set being distinct from the first set;

selecting from the second set a coding resource member having a highest relative merit; and establishing a call specified by the call request using the selected coding resource member.

16. The call establishment method of claim 15, wherein the determining includes:

receiving at least one supported coding resource of an endpoint specified with the call request; and assembling the candidate list from the at least one received supported coding resource.

17. The call establishment method of claim 16, wherein the call request specifies an originating endpoint and at least one destination endpoint; and wherein the receiving comprises receiving at least one supported coding resource member for each of the originating and at least one destination endpoints.

18. The call establishment of claim 15, wherein the ranking comprises ranking the second set of coding resource members according to at least one of perceived voice quality, bandwidth usage, and endpoint digital signal processing resource usage.

19. The call establishment method of claim 15, wherein the call establishing fails to establish the call when the second set is empty.

20. A method of managing calls over a data network, comprising:

determining usage information of the data network;

receiving a call request for establishing a telephony communications session between at least two network terminals;

selecting one or more of a plurality of resource elements as candidates for use in the requested telephony communications session in response to the call request based on usage information of the data network, wherein the resource elements define one or more characteristics of data exchanged between the network terminals; and receiving information relating to the plurality of resource elements during establishing of the telephony communications session.

21. The method of claim 20, wherein the selecting includes selecting one or more resource elements based on actual usage of the data network.

22. The method of claim 20, wherein the selecting includes selecting one or more codecs as candidates for use in each network terminal.

23. The method of claim 20, wherein the selecting includes selecting one or more sizes of a packet as candidates for carrying audio data in the requested telephony communications session.

24. The method of claim 20, further comprising:

determining a condition of the data network, wherein the selecting is further based on the determined condition.

25. The method of claim 24, wherein the determining includes determining a delay in the transmission of packets in the data network.

26. The method of claim 24, wherein the determining includes determining a percentage of packet loss in the data network.

27. The method of claim 24, further comprising determining an expected quality of service based on the determined condition of the data network.

28. A server for managing calls in a system having a network, comprising:

an interface to the network to receive a call request to establish a call between two endpoints on the network; and a control unit adapted to process the call request and to control selection of one or more of a plurality of resource elements as candidates to be employed by the endpoints in the call based on usage of the data network, wherein the resource elements comprise at least one of codecs to be employed by the endpoints in the call and sizes of messages to be used for carrying audio data in the call, wherein the control unit is adapted to receive information relating to the plurality of resource elements from an originating one of the two endpoints during call establishment.

29. The server of claim 28, wherein the control unit is adapted to retrieve information regarding usage of the network, the control unit controlling selection of the one resource element based on the usage.

30. The server of claim 28, wherein the sizes of messages are determined by a selected number of frames carrying audio data in each message.

31. The server of claim 28, wherein the calls include telephony calls.

32. The server of claim 28, wherein the control unit is adapted to receive the information in the call request.

* * * * *